United States Patent [19]

Fuderer

[11] Patent Number: 4,468,237

[45] Date of Patent: Aug. 28, 1984

[54] PRESSURE SWING ADSORPTION WITH DIRECT AND INDIRECT PRESSURE EQUALIZATIONS

[75] Inventor: Andrija Fuderer, Antwerp, Belgium

[73] Assignee: Union Carbide Corporation, Danbury, Conn.

[21] Appl. No.: 435,114

[22] Filed: Oct. 19, 1982

[51] Int. Cl.$^3$ ............................................. B01D 53/04
[52] U.S. Cl. ......................................... 55/26; 55/62; 55/68; 55/75
[58] Field of Search ................... 55/25, 26, 58, 62, 68, 55/75, 179, 389

[56] References Cited

U.S. PATENT DOCUMENTS

| | | | |
|---|---|---|---|
| 3,176,444 | 4/1965 | Kiyonaga | 55/62 X |
| 3,430,418 | 3/1969 | Wagner | 55/25 |
| 3,788,036 | 1/1974 | Lee et al. | 55/25 |
| 3,977,845 | 8/1976 | Walter | 55/25 |
| 3,986,849 | 10/1976 | Fuderer et al. | 55/25 |
| 4,021,210 | 5/1977 | Streich et al. | 55/26 |
| 4,160,651 | 7/1979 | Pivard | 55/62 X |
| 4,263,018 | 4/1981 | McCombs et al. | 55/25 X |
| 4,340,398 | 7/1982 | Doshi et al. | 55/62 X |
| 4,350,500 | 9/1982 | Esselink | 55/26 |

FOREIGN PATENT DOCUMENTS 22603 7/1980 European Pat. Off. .

Primary Examiner—Robert H. Spitzer
Attorney, Agent, or Firm—Alvin H. Fritschler

[57] ABSTRACT

In pressure swing adsorption systems having at least five adsorbent beds, three or more cocurrent depressurization-pressure equalization steps are employed in each processing cycle. At least one indirect equalization step is employed between two direct pressure equalizations in which void space gas released from the product end of a bed is passed directly to another bed initially at lower pressure so as to equalize the pressure therebetween. In such indirect pressure equalization step, said void space gas is introduced into an external storage tank from which it is passed to a bed being repressurized for indirect pressure equalization between two direct equalization steps in the repressurization of said bed. Sequential direct-indirect-direct-indirect or indirect-direct-indirect-direct processing steps are preferred.

17 Claims, No Drawings

PRESSURE SWING ADSORPTION WITH DIRECT AND INDIRECT PRESSURE EQUALIZATIONS

BACKGROUND OF THE INVENTION

1. Field of the Invention

The invention relates to the purification of gases in a pressure swing adsorption system. More particularly, it relates to the enhancing of product recovery and/or purity in such systems.

2. Description of the Prior Art

The pressure swing adsorption (PSA) process and system provide a well established means for separating and purifying at least one gas component from a feed gas mixture of said component and at least one selectively adsorbable component. The process includes adsorption of said selectively adsorbable component at a higher adsorption pressure, and pressure reduction to a lower desorption pressure to desorb said selectively adsorbable component. It is generally desirable to employ the PSA process in multi-bed systems such as those described in the Wagner patent, U.S. Pat. No. 3,430,418, in which at least four adsorption beds are employed. The PSA process is carried out in such systems, on a cyclic basis, employing a processing sequence that includes (1) high pressure adsorption, (2) cocurrent depressurization to intermediate pressure levels, with release of void space gas from the product end of the bed, (3) countercurrent depressurization or blowdown to a lower desorption pressure bed, (4) repressurization to the higher adsorption pressure. Wagner teaches the passing of a portion of the void space gas from one bed during cocurrent depressurization directly to another bed initially at its lower desorption pressure so as to equalize the pressure in the two beds at an intermediate pressure level. In a further development, the Fuderer et al patent, U.S. Pat. No. 3,986,849, teaches the use of three such cocurrent depressurization-direct pressure equalization steps in adsorption systems having at least seven beds, with two of the beds being on their adsorption step, in overlapping processing sequence, at all stages of the processing operation.

The use of cocurrent depressurization-direct pressure equalization steps, as is taught by the patents referred to above, enables highly efficient processing cycles to be practiced in hydrogen purification and other practical PSA applications. Multi-bed systems employing such cycles combine enhanced productivity with a substantially uniform flow of product effluent therefrom. While such direct pressure equalization systems are highly advantageous for many applications, known competitive PSA cycles can be based upon the use of cocurrent depressurization steps with the release gas being passed to external vessels for indirect pressure equalization purposes. Thus, systems can be employed in which no direct pressure equalization steps are used. A quite efficient indirect cycle known in the art employs a series of indirect equalizations into external vessels provided with heat capacity packings to reduce temperature swing effects and to increase effective gas storage in the external vessels.

A disadvantage of indirect pressure equalizations is the cost of the gas storing vessel or vessels employed, although this is partly compensated for by the reduced number of valves, and the very simple piping, pertaining in such indirect pressure equalization systems. For instance, a system employing six indirect pressure equalizations can be used to achieve a product recovery essentially the same as an eight or ten bed system employing three direct pressure equalization steps. Because of the larger number of valves and controls, and the more complex piping involved, desirable systems based on direct pressure equalizations, on the other hand, become increasingly costly as the number of direct equalization steps is increased. Each such direct equalization generally requires an additional valve for each bed, e.g. ten more valves for each additional direct equalization in a ten bed system.

Thus, both direct pressure equalization systems and indirect pressure equalization systems have advantages and limitations in commercial practice. The direct pressure equalization systems have the lowest vessel cost, but the highest valve and control costs, whereas indirect systems have the highest vessel costs, but the lowest valve and control costs. It is desirable in the art to develop processes and systems for providing the advantages of direct pressure equalizations at lower overall costs. It is likewise desirable to improve the efficiency of indirect equalizations without undue increases in the overall costs of such processes and systems, particularly as applied to greater flowrate operations. As those skilled in the art will also appreciate, it is always further desired to enhance product recovery and/or purity in practical commercial pressure swing adsorption operations.

It is an object of the invention, therefore, to provide an improved pressure swing adsorption process and system.

It is another object of the invention to provide a PSA process and system enhancing product recovery and/or purity.

It is a further object of the invention to provide a PSA process and system having a desirable balance of enhanced efficiency and reduced costs for valves and related controls.

With these and other objects in mind, the invention is hereinafter described in detail, the novel features thereof being particularly pointed out in the appended claims.

SUMMARY OF THE INVENTION

The invention achieves enhanced pressure swing adsorption performance by incorporating at least one indirect pressure equalization step between two direct equalization steps in PSA systems having at least five adsorption beds. The void space gas passed to an external storage tank during such indirect pressure equalization is thereafter passed to an adsorbent bed being repressurized for pressure equalization therewith, said indirect repressurization occurring intermediate two direct pressure equalization steps in said bed being repressurized. At least two indirect and two direct pressure equalizations in alternating sequence comprise particularly advantageous embodiments of the invention.

DETAILED DESCRIPTION OF THE INVENTION

The objects of the invention are accomplished by the use of PSA processes and systems in which the advantageous features of indirect pressure equalization are incorporated into direct equalization approaches in the manner indicated above. The practice of the invention thus enables highly desirable direct pressure equalization processes and systems to be efficiently complemented by indirect equalizations such as to enhance overall performance.

As indicated above, the pressure swing adsorption process to which the invention relates provides for the selective adsorption of at least one component of a feed gas mixture in an adsorption system having at least five adsorbent beds. Each bed undergoes, on a cyclic basis, a processing sequence including higher pressure adsorption, cocurrent depressurization to intermediate pressures with release of void space gas from the product end of the bed, countercurrent depressurization to a lower desorption pressure bed and/or purge, and repressurization to the higher pressure for further adsorption. At least a portion of the void space gas released from each bed during its cocurrent depressurization step is passed, in turn, directly to at least two other beds initially at lower pressures to equalize the pressure therebetween in direct pressure equalization steps. In accordance with the practice of the invention, void space gas released from the product end of a bed being cocurrently depressurized is introduced into an external storage tank after completion of a direct pressure equalization step in which void space gas released from the product end of said bed is passed directly to another bed in the adsorption system, and prior to the initiation of such direct pressure equalization between said bed being cocurrently depressurized and a different bed in the system. The void space gas thus introduced into the external storage tank is thereafter used for pressure equalization purposes in a particular manner constituting another element of the process and system herein described and claimed. Thus, the gas in said storage tank is used for indirect pressure equalization with a bed being repressurized, with said gas being passed to such bed at a point intermediate two direct pressure equalizations in which said space gas is passed directly from other beds to said bed being repressurized. During the cocurrent depressurization steps in each bed, therefore, the released void space gas used for pressure equalizations is employed in a direct-indirect-direct sequence, or in a direct-indirect-direct-indirect sequence or in an indirect-direct-indirect-direct sequence, and the repressurization of each bed from a lower desorption pressure similarly includes such sequences. It is specifically noted that the benefits achieved thereby cannot be fully realized with a direct-indirect-indirect-direct sequence or an indirect-direct-direct-indirect sequence, and processes including these latter sequences are not included within the scope of the invention.

The invention as described above can be used advantageously in the five bed system herein described for illustrative purposes, but the invention should not be construed as limited by the particular features of said system. Each bed in the illustrative five bed system undergoes a processing cycle comprising (a) high pressure adsorption;
(b) cocurrent depressurization-direct pressure equalization with another bed to an upper intermediate pressure;
(c) cocurrent depressurization-indirect pressure equalization with void space gas being passed to said external storage tank at an intermediate pressure;
(d) cocurrent depressurization-direct pressure equalization with a different bed to a lower intermediate pressure;
(e) cocurrent depressurization with the released void space gas being used to provide purge gas to a bed to be purged;
(f) countercurrent depressurization to lower desorption pressure;
(g) purge at said desorption pressure;
(h) sequential direct-indirect-direct pressure equalizations for the repressurization of the bed from its lower desorption pressure to upper intermediate pressure; and
(i) final repressurization from said upper intermediate pressure to said higher adsorption pressure. In a particular processing cycle in each bed for said illustrated embodiment of the invention, void space gas released therefrom during cocurrent depressurization-direct pressure equalization step (b) above is passed to the second higher numbered bed of the five bed system. The gas released therefrom during cocurrent depressurization-indirect pressure equalization step (c) is passed to the third higher numbered bed, and gas released during cocurrent depressurization-direct pressure equalization step (d) is likewise passed to said third higher numbered bed in the system. Gas is passed to each said bed during repressurization step (h) from the second higher numbered bed in the first direct pressure equalization step and from the third higher numbered bed in the second direct pressure equalization. This overall cycle is shown in Table I below, from which it will be seen that the cyclic process as described above is based on the processing sequence reverting to bed one after bed five in continuous processing operations.

TABLE I

| Bed No. | Cycle (512) E | | | | | | | | | |
|---|---|---|---|---|---|---|---|---|---|---|
| 1 | A | 1\|E\|2 | PP | D | P | 2\|E\|1 | R | | | |
| 2 | 1 | R | A | 1\|E\|2 | PP | D | P | 2\|E | | |
| 3 | P | 2\|E\|1 | R | A | 1\|E\|2 | PP | D | P | | |
| 4 | PP | D | P | 2\|E\|1 | R | A | 1\|E\|2 | PP | | |
| 5 | 1\|E\|2 | PP | D | P | 2\|E\|1 | R | A | | | |

In this Table, A represents adsorption; the numerals 1 and 2 represent the first and second cocurrent depressurization-direct pressure equalization steps, respectively, between a bed that has completed its adsorption step at higher adsorption pressure and beds being repressurized; E represents a cocurrent depressurization-indirect pressure equalization step in which released void space gas is passed to an external storage tank intermediate two direct pressure equalizations and, correspondingly, in which said void space gas is passed from said storage tank to a bed being repressurized intermediate two direct pressure equalizations; PP represents a cocurrent depressurization-provide purge gas step in which release void space gas is passed directly to another bed for purge purposes; D represents a countercurrent depressurizaton or blowdown step to lower desorption pressure, P represents a purge step at lower desorption pressure; and R represents repressurization to the higher adsorption pressure. In the illustrated process and system, it will be seen that one of the five beds is on its adsorption step, in sequence, at any given time in the processing cycle. The overall cycle is referred to in the heading as (512) E, the five representing the number of beds in the system, the one representing the number of beds on adsorption at any given time, the two representing the number of direct pressure equalization steps and E denoting the point of novelty of the invention wherein an indirect pressure equalization step is included in the cycle, with void space gas passing from a bed to the external storage tank during a cocurrent depressurization-indirect pressure equalization step between two direct pressure equalizations and with said void space gas being passed from such external storage tank to a bed being repressurized between two direct pressure equalizations for said bed being repressurized.

In the practice of the invention, each external storage tank used for said intermediate indirect pressure equalization step will generally have a volume of from about 20% to about 120% based on the volume of each adsorbent bed. Each adsorbent bed will, of course, comprise a known, commercially available adsorbent material capable of selectively adsorbing at least one more readily adsorbable gas component(s) from a feed gas mixture containing said component(s) and at least one less readily adsorbable gas component(s).

In preferred embodiments of the invention, the portion of the released void space gas employed for indirect pressure equalization is passed from each bed to the external storage tank in at least two separate indirect pressure equalization steps. In such instances, the processing cycle is carried out in each bed so that at least two of the direct pressure equalizations and at least two of the indirect pressure equalizations comprise alternating direct and indirect pressure equalization steps. It is within the scope of the invention to carry out the cocurrent depressurization-pressure equalization steps in either an indirect-direct-indirect-direct sequence or in a direct-indirect-direct-indirect sequence. As noted above, however, the invention does not include direct-indirect-indirect-direct or indirect-direct-direct-indirect sequences. The embodiments of the invention are capable of obtaining product recovery and/or purity levels heretofore obtainable only by the use of several more adsorbent beds in processes and systems utilizing direct equalizations without such indirect equalizations as herein described and claimed. In addition to such processing efficiency, the invention enables reduced valve and control costs to be realized as compared with such costs for processes and systems having direct equalizations only to achieve high performance in large production operations. Thus, it is feasible in certain embodiments of the invention, wherein two direct equalizations are employed, to employ only a single valve and an external storage tank for each indirect equalization step employed. In other cases, where two indirect pressure equalizations are employed and where the second direct equalization requires only one valve for each pair of beds, e.g., four valves for an eight bed system, a second indirect equalization will require four or five additional valves for integration with said direct equalization system. In any event, however, the practice of the invention serves to enhance the high performance heretofore obtainable in direct equalization systems while achieving apparatus simplifications heretofore associated with less efficient indirect equalization systems.

In a five bed system employing alternating direct and indirect pressure equalization steps in another illustrative embodiment of the invention, the cocurrent depressurization is carried out in each bed with released void space gas passing in the following sequence:

(a) to an external storage tank for indirect pressure equalization;
(b) to another bed in the system for direct pressure equalization;
(c) to an external storage tank for a second indirect equalization;
(d) to a different bed in the system to provide purge gas to said bed; and
(e) to another bed in the system for direct pressure equalization.

It will be appreciated, therefore, that intervening cocurrent depressurizaton-provide purge steps can be employed in the practice of the invention as long as the alternating direct and indirect sequence is maintained for the cocurrent depressurization-pressure equalization steps of the invention regardless of any such intervening steps. As in the embodiments of the invention employing a single indirect equalization, the external storage tank(s) in embodiments having more than one direct equalization step will have a volume of generally from about 20% to about 120%, commonly from about 30% to about 100%, based on the volume of each adsorbent bed in the system.

While the invention may be practiced in any system having at least five beds, the system is advantageously practiced in systems having from five to ten adsorbent beds. Table II below is provided to illustrate a particular six bed process and system, namely a (622) 2E system in which two beds are in adsorption at all times, in overlapping sequence, and in which two direct equalizations and two indirect equalizations are employed as follows:

TABLE II

| Bed No. | Cycle (622) 2E |
|---|---|
| 1 | A \| 1 \| 1E \| 2 \| 2E \| EE \| D \| P \| 2E \| 2 \| 1E \| 1 \| R |
| 2 | 1 \| R \| A \| 1 \| 1E \| 2 \| 2E \| EE \| D \| P \| 2E \| 2 \| 1E |
| 3 | P \| 2E \| 2 \| 1E \| 1 \| R \| A \| 1 \| 1E \| 2 \| 2E \| EE \| D \| P |
| 4 | EE \| D \| P \| 2E \| 2 \| 1E \| 1 \| R \| A \| 1 \| 1E \| 2 \| 2E |
| 5 | 1 \| 1E \| 2 \| 2E \| EE \| D \| P \| 2E \| 2 \| 1E \| 1 \| R \| A |
| 6 | A \| 1 \| 1E \| 2 \| 2E \| EE \| D \| P \| 2E \| 2 \| 1E \| 1 \| R \| A |

In this direct-indirect-direct-indirect sequence cycle, void space gas released during the first cocurrent depressurization-direct pressure equalization is passed to the third higher numbered bed, while such gas during the second such direct equalization step is passed to the fourth higher numbered bed (with the sequence reverting to bed one after bed six as will be appreciated from the Table). The gas released during the first indirect equalization step, i.e. step 1E, passes to the external storage vessel from which it is passed to a bed being repressurized, i.e. to the fourth higher numbered bed at a processing point, step 1E, intermediate two direct pressure equalizations for partial repressurization of said bed. The gas released during the second indirect equalization step, i.e. step 2E, passes similarly to said external storage tank from which it is passed to a bed being repressurized, i.e. to the fifth higher numbered bed at a point, i.e. step 2E, preceding a direct-indirect-direct sequence for partial repressurization of said bed. In the illustrated embodiment of the invention, an EE step is also included, said EE denoting a cocurrent depressurization-provide purge gas step in which a portion of the gas released is passed directly to another bed for such purge purposes, i.e. to the fifth higher numbered bed in the system. The remaining portion of said gas passes simultaneously to said external storage tank from which said gas is thereafter introduced into the bed from which it was obtained for purge purposes, after countercurrent depressurization step D, and prior to the passage of gas directly to said bed, for purge purposes, from said next higher numbered bed, again considered in repeating 1–6 sequence. It is found that the above-indicated (622) 2E cycle is as efficient as a (10,3,3) cycle employing the processing cycle of the Fuderer et al patent referred to above in a ten bed system.

Those skilled in the art will appreciate that a variety of similar cycles can be employed in the practice of the invention. Thus, a (934) 4E cycle can advantageously be employed, said cycle being practiced in a system comprising nine adsorbent beds, with three beds in adsorption at all stages of the processing cycle in overlapping sequence, and in which the cocurrent depressurization-pressure equalization in each bed comprises four direct and four indirect pressure equalizations, each in alternating processing sequence. It is also within the scope of the invention to employ systems having eight adsorbent beds with two or three beds in adsorption at all times. In an (824) 3E cycle, with two beds in adsorption, the cocurrent depressurization-pressure equalization in each bed comprises four direct and three indirect pressure equalizations in alternating processing sequence. In an (832) 2E, with three beds on adsorption, the cocurrent depressurization-pressure equalization in each bed comprises two direct and two indirect pressure equalizations, each in alternating processing sequence. In another illustrative example, a (723) 3E cycle may be employed in a seven bed system, with two beds in adsorption and in which three direct and three indirect equalizations are carried out in alternating processing sequence. Those skilled in the art will appreciate that a variety of such processing cycles can be employed within the scope of the invention as herein described and claimed.

In practicing the invention, it will be readily appreciated that such PSA systems necessarily incorporate various conduits, valves and other control features to accomplish the necessary switching of the adsorbent beds from one processing step to the next in appropriate sequence. Conventional conduits and control features known in the art are employed for such purposes. It will be understood that the external storage tank or tanks are employed together with conduit means for passing void space gas, upon completion of direct pressure equalization by the passage of void space gas from a bed being cocurrently depressurized to another bed in the adsorption system and prior to the initiation of pressure equalization between said bed being cocurrently depressurized and a different bed in the system, from said bed being cocurrently depressurized to said external storage tank. Conduit means are also provided for passing void space gas from said external storage tank to an adsorbent bed being repressurized for pressure equalization therebetween, with said indirect pressure equalization occurring intermediate the two direct pressure equalizations. Means are similarly provided, in said systems of at least five beds, for passing feed gas to the desired number of beds at all stages of the cycle in overlapping sequence and for adapting each bed to the desired processing cycle as described above within the scope of the invention.

The pressure swing adsorption process and system of the invention can be used advantageously to selectively adsorb at least one component of a feed gas mixture, thereby separating and purifying a desired product effluent gas. The invention is particularly useful in the separating and purifying of hydrogen present as a major component of a feed gas mixture also containing carbon dioxide as a selectively adsorbable component, commonly together with other undesired impurities, such as nitrogen, argon, carbon monoxide, light saturated hydrocarbons, aromatics, light sulfur compounds and the like. Those skilled in the art will appreciate that the invention can also be employed for other practical gas separations, as in air separation and in the purification of methane from mixtures thereof with carbon dioxide, ammonia, hydrogen sulfide and the like. The particular adsorbent employed for any given gas separation operation will depend, of course, upon the particular separation being carried out, with the adsorbent having a selectivity for one component of a feed gas mixture over another, as for the impurity over the desired product. Suitable adsorbents include zeolite molecular sieves, activated carbon, silica gel, activated alumina and the like. Zeolite molecular sieves are generally desirable adsorbents in the separation and purification of hydrogen contained in mixtures thereof with carbon dioxide, nitrogen and the like. The Kiyonaga patent, U.S. Pat. No. 3,176,444, and the Wagner and Fuderer et al patents referred to above contain additional information concerning suitable adsorbents for use in PSA gas separation operations.

It will be appreciated that various changes and modifications can be made in the process and system described herein without departing from the scope of the invention as disclosed and claimed. While the invention has been described, for example, in terms of embodiments employing both countercurrent depressurization and purge steps, it is also possible to employ either one of these steps without the other although both steps are commonly employed. The number of adsorbent beds employed in five or more bed systems, the number of equalizations utilized, the number of beds in adsorption at any given time, the particular sequence in which processing steps are carried out, all are not critical to the invention provided that the desired pressure equalization sequences, both for depressurization and for repressurization, are carried out in accordance with the invention. Similarly, it is within the scope of the invention to employ the subject direct-indirect-direct pressure equalization sequence for either enhanced product recovery or product purity, or for an advantageous combination of such desirable effects.

In a typical example, the invention is used to separate and recover hydrogen from a feed gas mixture containing 80% hydrogen by volume in admixture with carbon dioxide, nitrogen and other impurities. An (824) 3E system is employed with two of the eight beds being in adsorption at any given time, with four direct equalizations and with three indirect equalizations. A direct-indirect-direct-indirect-direct-indirect-direct processing sequence is employed during cocurrent depressurization-pressure equalization. The adsorption pressure is 49 BAR, and the lower desorption pressure is 1.22 BAR. Recovery of 99.99+% hydrogen product in such a system is 93%. The pressure change rate for such a system is very similar to that of a conventional system employing four direct equalizations without indirect equalizations. All of the other steps, e.g., adsorption, purge, countercurrent depressurization, providing purge, have essentially the same duration as such a direct equalization system. The process and system of the invention are found to have the same efficiency as is obtainable in cycles having indirect equalizations only by the inclusion of ten such indirect equalizations. Such an indirect equalization, however, requires a very large volume of gas storage tanks, i.e., more than the volume of all of the beds in the system, making such a system prohibitively expensive in practical commercial operations. The process and system of the invention is also found to have the same efficiency as is obtainable in cycles employing direct equalizations only by the inclusion of five direct equalizations, as in (925) or (11, 3, 5) cycles. Such cycles, however, require at least one additional adsorbent bed and inherently require more complex and costly piping and valve systems than is needed in the practice of the invention.

The practice of the invention thus permits further, highly desirable processing flexibility and operating economies to be achieved in the practice of the pressure swing adsorption technology. By enabling product recovery and/or product purity to be enhanced, and by simplifying complex piping and control requirements, and reducing the number of adsorbent beds that need be employed in practical commercial operations, the invention contributes in a significant manner to the continuing development of said pressure swing adsorption technology.

I claim:

1. In a pressure swing adsorption process for the selective adsorption of at least one component of a feed gas mixture in an adsorption system having at least five adsorbent beds, each of which undergoes, on a cyclic basis, higher pressure adsorption, cocurrent depressurization to upper intermediate pressure with release of void space gas from the product end of the bed for direct passage to another bed initially at lower pressure to equalize the pressure therebetween at said upper intermediate pressure, further cocurrent depressurization to lower intermediate pressure with release of additional void space gas from the product end of the bed for direct passage to a different bed initially at lower pressure to equalize the pressure therebetween at said lower intermediate pressure, countercurrent depressurization to a lower desorption pressure and/or purge with release of gas from the feed end of the bed at said lower desorption pressure, partial repressurization to said lower intermediate pressure by the passage of void space gas from a different bed initially at higher pressure directly to said bed to equalize the pressure therebetween at said lower intermediate pressure, further partial repressurization to said higher intermediate pressure by the passage of void space gas from another bed initially at higher pressure directly to said bed to equalize the pressure therebetween at said upper intermediate pressure, and final repressurization from said upper intermediate pressure to said higher adsorption pressure, the improvement consisting essentially of:

(a) upon completion of direct pressure equalization by the passage of void space gas from a bed being cocurrently depressurized directly to another bed in the adsorption system initially at lower pressure for pressure equalization therebetween at said upper intermediate pressure, and prior to the initiation of direct pressure equalization between said bed being cocurrently depressurized and a different bed in said system by the passage of void space gas from said bed being cocurrently depressurized directly to said bed initially at lower pressure for pressure equalization therebetween at said lower intermediate pressure, introducing void space gas released from the product end of said bed being cocurrently depressurized to an external storage tank initially at lower pressure for subsequent pressure equalization usage, said bed and external storage tank being at an intermediate pressure after pressure equalization therebetween, said intermediate pressure being lower than said upper intermediate pressure and higher than said lower intermediate pressure; and (b) passing said void space gas from said external storage tank at said intermediate pressure to an adsorbent bed in the system initially at lower pressure and being repressurized for indirect pressure equalization therebetween, said indirect pressure equalization of the bed being partially repressurized occurring immediately after partial repressurization to lower intermediate pressure by direct pressure equalization with another bed and immediately before partial repressurization to upper intermediate pressure by a second direct pressure equalization with a different bed, said indirect pressure equalization thus being intermediate two direct pressure equalizations in which void space gas is passed directly from said other beds to said bed being partially repressurized to upper intermediate pressure prior to final repressurization to higher adsorption pressure, whereby product recovery and/or purity is enhanced by said inclusion of at least one indirect pressure equalization immediately between two direct equalizations.

2. The process of claim 1 in which the adsorption system comprises five adsorbent beds with the processing cycle in each bed consisting essentially of:

(a) higher pressure adsorption;

(b) cocurrent depressurization-direct pressure equalization with another bed initially at lower pressure to equalization at an upper intermediate pressure;

(c) cocurrent depressurization-indirect pressure equalization with void space gas being passed to said external storage tank initially at lower pressure at an upper intermediate pressure;

(d) cocurrent depressurization-indirect pressure equalization with void space gas being passed to said external storage tank at an intermediate pressure;

(e) cocurrent depressurization-direct pressure equalization with a different bed to a lower intermediate pressure;

(f) cocurrent depressurization with the released void space gas being used to provide purge gas to a bed to be purged;

(g) countercurrent depressurization to lower desorption pressure;

(h) purge at said lower desorption pressure;

(i) partial repressurization of the bed from its lower desorption pressure to lower intermediate pressure by direct pressure equalization with another bed initially at said intermediate pressure;

(j) further partial repressurization of the bed from said lower intermediate pressure to a pressure higher than said lower intermediate pressure by indirect pressure equalization with said external storage tank initially at said intermediate pressure;

(k) additional partial repressurization of the bed to said higher intermediate pressure by direct pressure equalization with a different bed initially at said higher adsorption pressure;

(l) final repressurization from said upper intermediate pressure to said higher adsorption pressure.

3. The process of claim 2 in which, in the processing cycle for each bed, (a) void space gas released therefrom during cocurrent depressurization-direct pressure equalization in step (b) is passed to the second higher numbered bed of the five bed system, (b) said gas released therefrom during cocurrent depressurization-direct pressure equalization in step (d) is passed to the third higher numbered bed in said system, and (c) gas is passed to each said bed during repressurization step (h) from said second higher numbered bed in the first direct pressure equalization step and, during repressurization step (j), from said third higher numbered bed in the second direct pressure equalization step.

4. The process of claim 1 in which the external storage tank has a volume of 20% to about 120% based on the volume of each adsorbent bed employed in the adsorption system.

5. The process of claim 4 in which the volume of the external storage tank is from about 30% to about 100% based on the volume of each said bed.

6. The process of claim 1 in which the portion of the released void space gas employed for indirect pressure equalization is passed from each bed to said external storage tank in at least two separate indirect pressure equalization steps, with the processing cycle being carried out in each bed so that at least two of said direct pressure equalizations and at least two of said indirect pressure equalizations comprise alternating direct and indirect pressure equalization steps.

7. The process of claim 6 in which cocurrent depressurization-pressure equalization steps are carried out in an indirect-direct-indirect-direct sequence.

8. The process of claim 6 in which the cocurrent depressurization-pressure equalization steps are carried out in a direct-indirect-direct-indirect sequence.

9. The process of claim 6 in which the external storage tank has a volume of 20% to about 120% based on the volume of each adsorbent bed in the adsorption system.

10. The process of claim 9 in which the volume of the external storage tank is from about 30% to about 100% based on the volume of each said bed.

11. The process of claim 6 in which said adsorption system comprises from five to ten adsorbent beds.

12. The process of claim 6 in which the adsorption system comprises nine adsorbent beds, with three beds on adsorption at all stages of the processing cycle in overlapping sequence, and in which the cocurrent depressurization in each bed comprises four direct and four indirect pressure equalizations, each in alternating processing sequence.

13. The process of claim 8 in which said adsorption system comprises eight adsorbent beds, with two beds on adsorption at all stages of the processing cycle in overlapping sequence, and in which the cocurrent depressurization in each bed comprises four direct and three indirect pressure equalizations in alternating processing sequence.

14. The process of claim 8 in which said adsorption system comprises eight adsorbent beds, with three beds on adsorption at all stages of the processing cycle in overlapping sequence, and in which the cocurrent depressurization in each bed comprises two direct and two indirect pressure equalizations, each in alternating processing sequence.

15. The process of claim 8 in which the adsorption system comprises seven adsorbent beds, with two beds being on adsorption at all stages of the processing cycle, in overlapping sequence, and in which the cocurrent depressurization in each bed comprises three direct and three indirect equalizations each in alternating processing sequence.

16. The process of claim 8 in which said adsorption system comprises six adsorbent beds, with two beds on adsorption at all stages of the processing cycle in overlapping sequence, and in which the cocurrent depressurization in each bed comprises two direct and two indirect pressure equalizations, each in alternating processing sequence.

17. The process of claim 1 in which the product gas withdrawn from the system comprises hydrogen.

* * * * *